United States Patent
Lim et al.

(10) Patent No.: US 12,265,418 B2
(45) Date of Patent: Apr. 1, 2025

(54) DISPLAY SYSTEM

(71) Applicant: LENOVO (SINGAPORE) PTE. LTD., Singapore (SG)

(72) Inventors: Ghwang Hyun Lim, Morrisville, NC (US); Jung Hwan Hong, Morrisville, NC (US); Ali Ent, Morrisville, NC (US); Alden Rose, Morrisville, NC (US); Jeffrey E Skinner, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/955,009

(22) Filed: Sep. 28, 2022

(65) Prior Publication Data
US 2024/0103566 A1   Mar. 28, 2024

(51) Int. Cl.
  *G06F 1/16*    (2006.01)
  *F16M 11/12*   (2006.01)
  *F16M 11/24*   (2006.01)

(52) U.S. Cl.
  CPC ......... *G06F 1/1601* (2013.01); *F16M 11/123* (2013.01); *F16M 11/242* (2013.01)

(58) Field of Classification Search
  CPC .... G06F 1/1601; F16M 11/123; F16M 11/242
  See application file for complete search history.

(56) References Cited

U.S. PATENT DOCUMENTS

| | | | |
|---|---|---|---|
| 8,553,408 B2 * | 10/2013 | Supran | G06F 1/1632 361/679.02 |
| 9,678,537 B2 * | 6/2017 | Kupferstein | F16M 13/022 |
| 10,221,898 B2 * | 3/2019 | Castillo | H05K 5/0234 |
| 10,583,790 B2 * | 3/2020 | Wang | F16M 13/00 |
| 11,239,697 B2 * | 2/2022 | Min | H02J 7/0044 |
| 11,246,233 B2 * | 2/2022 | Venkatesh | H05K 5/0234 |
| 11,441,724 B2 * | 9/2022 | Huang | F16M 11/16 |
| 11,530,779 B2 * | 12/2022 | Epstein | F16M 11/105 |
| 11,672,089 B2 * | 6/2023 | Lee | F16M 11/041 361/807 |
| 11,719,382 B2 * | 8/2023 | Jankura | F16M 11/14 248/371 |
| 11,788,609 B2 * | 10/2023 | Laurent | G06F 1/1601 248/123.11 |
| 2008/0035808 A1 * | 2/2008 | Rawlings | F16M 11/2021 248/176.1 |
| 2013/0068915 A1 * | 3/2013 | Yang | F16M 11/041 248/551 |
| 2013/0078855 A1 * | 3/2013 | Hornick | F16M 11/041 439/571 |
| 2015/0201113 A1 * | 7/2015 | Wood | F16M 13/04 348/376 |
| 2015/0369418 A1 * | 12/2015 | Wong | F16M 13/00 248/309.3 |
| 2018/0216777 A1 * | 8/2018 | Speicher | F16M 13/02 |
| 2019/0338885 A1 * | 11/2019 | Hu | H01R 13/631 |

(Continued)

*Primary Examiner* — Rockshana D Chowdhury
(74) *Attorney, Agent, or Firm* — Brian J. Pangrle

(57) ABSTRACT

A system can include a display assembly that includes a rectangular housing that includes a back side that includes a raised portion and an attachment surface adjacent to the raised portion; and a stand that includes a base, a joint assembly and a coupling that magnetically couples to the attachment surface of the display assembly.

16 Claims, 16 Drawing Sheets

(56) References Cited

U.S. PATENT DOCUMENTS

| | | | |
|---|---|---|---|
| 2021/0240059 A1* | 8/2021 | Ma | F16M 11/041 |
| 2021/0247667 A1* | 8/2021 | Chu | F16M 11/10 |
| 2022/0099243 A1* | 3/2022 | Rosheim | F16M 11/123 |
| 2022/0146042 A1* | 5/2022 | Zhao | F16M 11/123 |
| 2022/0357778 A1* | 11/2022 | Waddell | G06F 1/1632 |

* cited by examiner

DISPLAY SYSTEM

TECHNICAL FIELD

Subject matter disclosed herein generally relates to display systems.

BACKGROUND

A display system can include a display assembly and a stand.

SUMMARY

A system can include a display assembly that includes a rectangular housing that includes a back side that includes a raised portion and an attachment surface adjacent to the raised portion; and a stand that includes a base, a joint assembly and a coupling that magnetically couples to the attachment surface of the display assembly. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
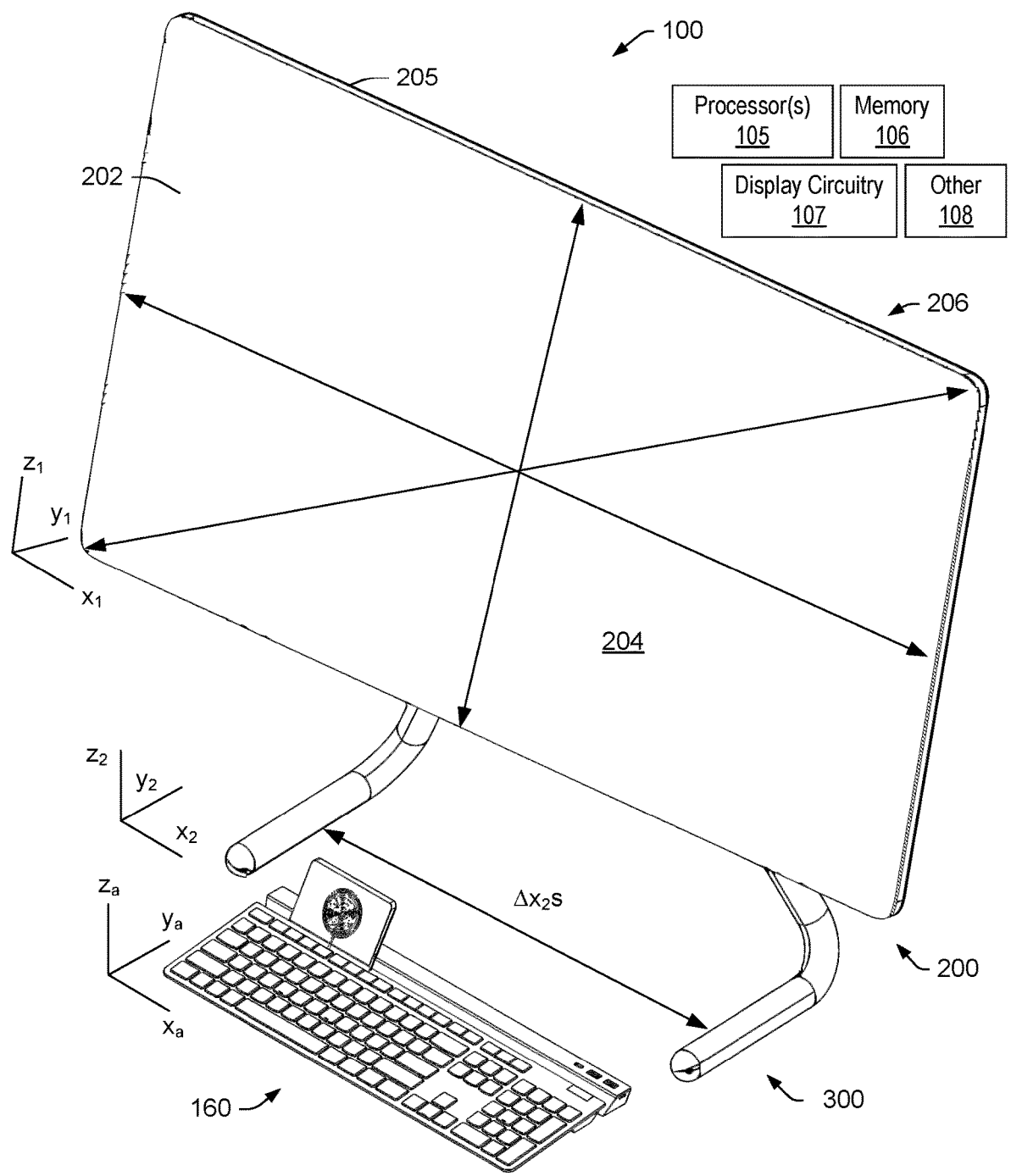
FIG. 1 is a perspective view of an example of a system.

FIG. 1 shows a perspective view of an example of a system 100 that can include one or more processors 105, memory 106 accessible to at least one of the one or more processors 105, display circuitry 107 and one or more other components 108, which can include electronic circuitry, instructions stored in the memory 106 and executable by at least one of the one or more processors 105, etc. As an example, the system 100 may include one or more accessories, peripherals, etc.

In the example of FIG. 1, the system 100 includes an example of a keyboard assembly 160 that may be operatively coupled to at least one of the one or more processors 105 (e.g., via wire, via wireless communication circuitry, etc.).

As shown in FIG. 1, the system 100 includes a display assembly 200 with a display 202 that may utilize one or more technologies (e.g., LED, LCD, etc.). The display assembly 200 can include a display side 204, a back side 206 and a frame 205. The display circuitry 107 can be operatively coupled to at least one of the one or more processors 105, for example, to receive data, instructions, etc., for rendering text, graphics, images, etc., to the display side 204 of the display 202. As an example, the display assembly 200 may be a computing device. For example, consider an all-in-one (AIO) type of computing device or another type of computing device.

As an example, the display circuitry 107 can include one or more graphics processing units (GPUs) and, for example, one or more of the one or more processors 105 can be a central processing unit (CPU). As an example, the display circuitry 107 can include input circuitry such as touch circuitry, digitizer circuitry, etc., such that the display side 204 is an input surface. For example, the display side 204 may receive input via touch, a stylus, etc. As an example, the display assembly 200 can include a touchscreen display where a finger, a stylus, etc., can be utilized; noting sensing as to input may occur with or without physical contact between a finger and the display side 204, between a stylus and the display side 204, etc., depending on the type of input circuitry utilized (e.g., resistive, capacitive, acoustic wave, infrared, optical, dispersive signal, etc.).

In the example of FIG. 1, the system 100 can include a stand 300 that can support the display assembly 200, for example, by coupling to the back side 206 of the display assembly 200. As shown in the example of FIG. 1, the display side 204 may be centered along a centerline of the system 100 and may be disposed at an angle that may be defined by the stand 300, as supported on a flat support surface such as a desktop, a tabletop, a countertop, etc.

As shown, the display assembly 200 and/or the display side 204 and the stand 300 can be defined with respect to one or more coordinate systems such as, for example, one or more Cartesian coordinate systems (see, e.g., $x_1$, $y_1$, $z_1$ and $x_2$, $y_2$, $z_2$). As shown, the display side 204 can be defined by a display area, which may be two-dimensional for a substantially flat (e.g., planar) display surface or which may be three-dimensional for a curved display surface, noting that such a curve may be of a relatively large radius of curvature (e.g., 50 cm or more) that gives the display a gentle curve (e.g., consider a radius of approximately the length of an extended arm of a user as traced by movement left and right from a shoulder of a user positioned in front of the display surface by an ergonomic distance). A gap or clearance can exist between a lower edge of the display assembly 200 and a support surface (e.g., a stand, a platform, a desktop, tabletop, countertop, etc.). Such a gap may provide for rotation of the display 202 (e.g., from a landscape orientation to a portrait orientation).

In the example of FIG. 1, the keyboard assembly 160 is illustrated along with a Cartesian coordinate system with $x_a$, $y_a$ and $z_a$ coordinates that may be utilized to describe one or more features of the keyboard assembly 160. As shown, the coordinate $x_a$ can define a length (side to side), the coordinate $y_a$ can define a depth (front to back) and the coordinate $z_a$ can define a height (bottom to top). As an example, the stand 300 may include a space that can accommodate the keyboard assembly 160. For example, in FIG. 1, a distance $\Delta x_2 s$ is shown as being of a width sufficient to accommodate a width of the keyboard assembly 160.

The system 100 may include one or more instances of charging circuitry. For example, when the display assembly 200 and the stand 300 may include an interface that may be wired and/or wireless for transfer of power to power circuitry of the display assembly 200. As an example, a wireless interface may include one or more features of the Qi standard.

Components that operate with the Qi standard utilize electromagnetic induction between coils. For example, a wireless charging system can include a base station that is connected to a power source for providing inductive power and a positionable device or assembly that can consume the provided inductive power. A base station can include a power transmitter that includes a transmitter coil that generates an oscillating magnetic field and the positionable device or assembly can include a power receiver that includes a receiver coil. In such an arrangement, a magnetic field can induce an alternating current in the receiver coil via Faraday's law of induction. To make transfer or power more efficient, a system can provide for close spacing of coils, shielding on their surfaces, etc.

Figure 2:
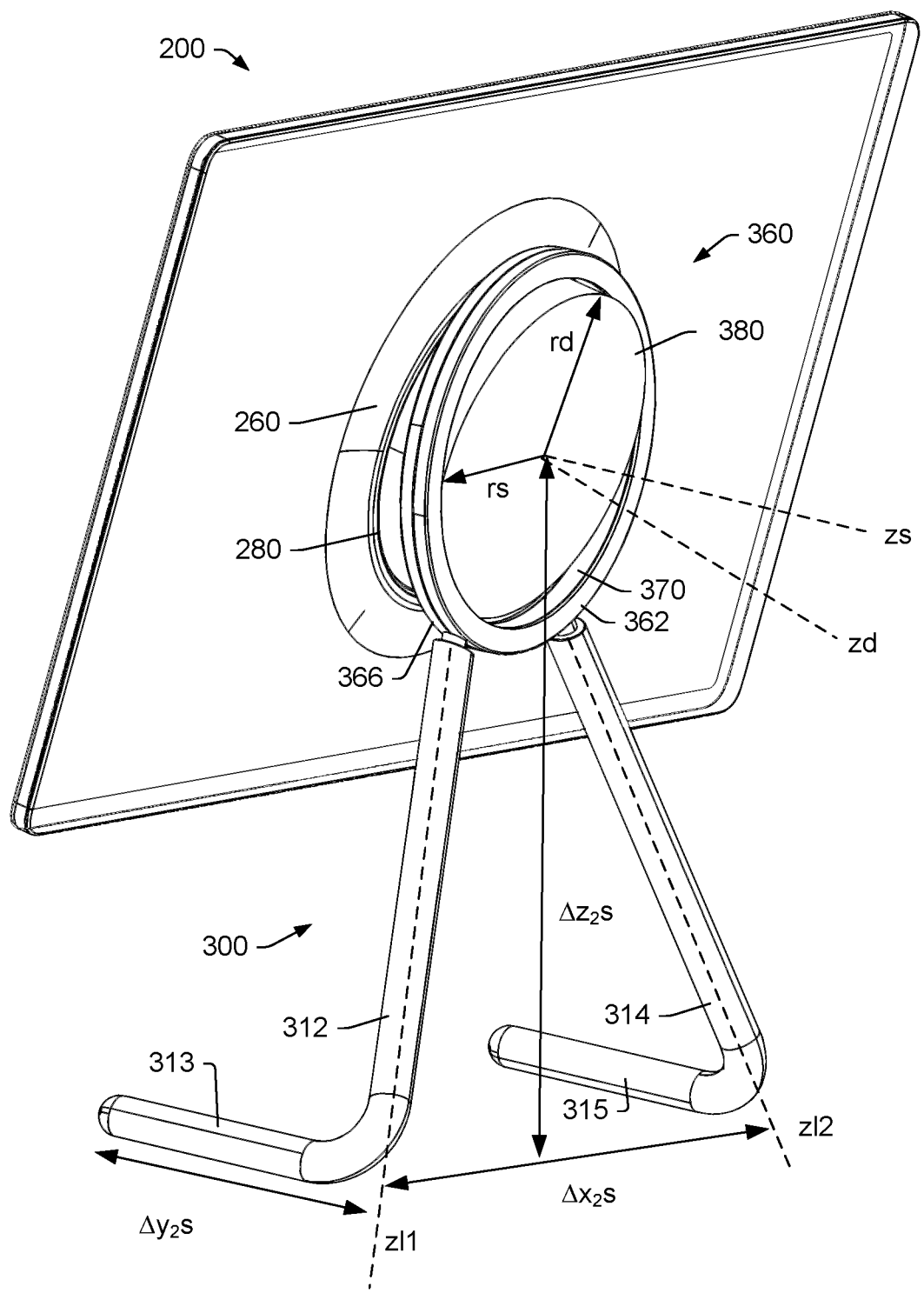
FIG. 2 is a perspective view of an example of a system.

FIG. 2 shows a back side perspective view of the system 100 without the keyboard assembly 160. As shown, the display assembly 200 can include a raised portion 260 that borders a surface 280 for attaching the display assembly 200 to a coupling 380 of the stand 300. In such an example, one or more magnetic materials may be utilized for magnetic coupling. For example, magnets or combinations of magnets and ferromagnetic materials may be utilized to establish a magnetic attraction force sufficient to couple the display assembly 200 to the stand 300.

In the example of FIG. 2, the coupling 380 of the stand 300 is supported by a joint assembly 360, which includes various components such as, for example, rotatable leg supports 362 and 366 that encapsulate a ring 370 where the coupling 380 is pivotably attached to the ring 370. In such an example, the coupling 380 can pivot and rotate via the joint assembly 360, for example, to tilt the display assembly 200 and/or to rotate the display assembly 200.

As an example, the joint assembly 360 may include one or more gimbal structures. A gimbal is a pivoted support that permits rotation of an object about an axis. A set of three gimbals, one mounted on the other with orthogonal pivot axes, may be used to allow an object mounted on the innermost gimbal to remain independent of the rotation of its support. In the example of FIG. 2, the ring 370 can be a gimbal structure that is also rotatable. As an example, the rotatable leg supports 362 and 366 and the ring 370 may be independently rotatable. In such an example, the rotatable leg supports 362 and 366 can include grooves that seat the ring 370 where the ring 370 may include axles or bores that receive axles that define a pivot axis where the coupling 380 can pivot about the pivot axis.

In the example of FIG. 2, the rotatable leg supports 362 and 366 provide for attachment of legs 312 and 314, which include base portions 313 and 315. As shown, each of the legs 312 and 314 may be substantially L shaped where the base portions 313 and 315 can extend a distance in a direction of the $y_2$ axis, as indicated by the distance $\Delta y_2 s$. As an example, the legs 312 and 314 may be angularly spaced via the rotatable leg supports 362 and 366 to thereby adjust the distance $\Delta x_2 s$ and a vertical distance $\Delta z_2 s$. For example, by increasing angular spacing of the legs 312 and 314, the vertical distance $\Delta z_2 s$ can be decreased. Similarly, by decreasing angular spacing of the legs 312 and 314, the vertical distance $\Delta z_2 s$ can be increased. Via various features, the stand 300 can provide for various adjustments to the display assembly 200 to accommodate a desired viewing height, angle, etc., of a user.

As shown in FIG. 2, the vertical distance $\Delta z_2 s$ can be measured from a bottom of the stand 300 to a center of the ring 370, which may define a stand axis zs. As explained, the coupling 380 can be pivotable via the ring 370 such that the stand axis zs can be aligned with or offset from a display axis zd, which can be normal (90 degrees) with respect to the display side 204 of the display assembly 200. In the example of FIG. 2, the coupling 380 has an outer perimeter that can be defined by a radius rd and the ring 370 has an inner perimeter that can be defined by a radius rs where the radius rs is greater than the radius rd, for example, to define an annular clearance such that the coupling 380 can freely pivot and rotate as supported by the joint assembly 360.

In the example of FIG. 2, the display assembly 200 can have a center of gravity that is relatively stationary upon rotation or pivoting of the display assembly 200 via the joint assembly 360 of the stand 300. In such an approach, movement of the display assembly 200 can be relatively smooth with reduced risk of toppling.

Figure 3:
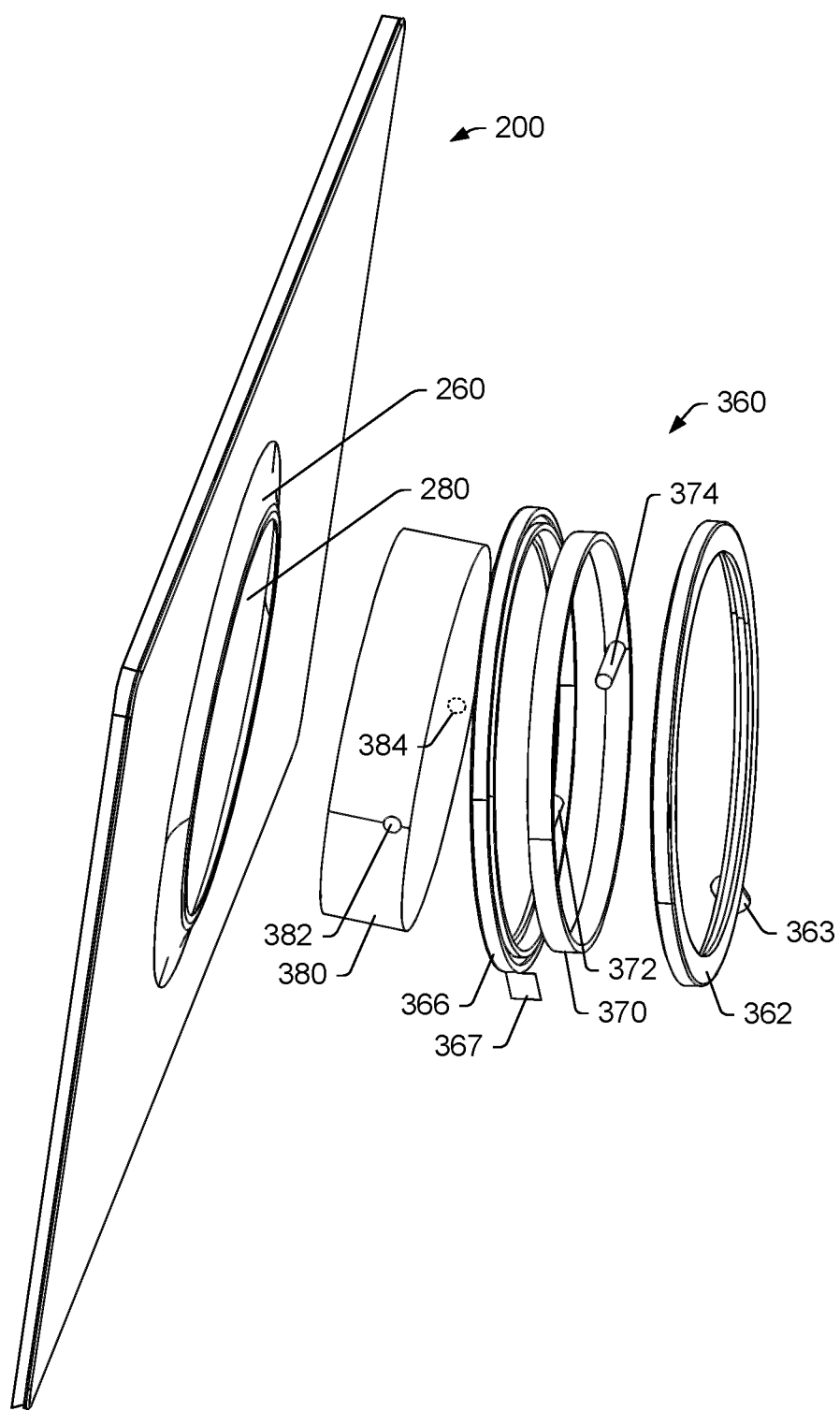
FIG. 3 is an exploded perspective view of an example of a portion of a system.

FIG. 3 shows an exploded perspective view of the display assembly 200 and a portion of the stand 300, particularly the joint assembly 360. As shown, the rotatable leg supports 362 and 366 include leg mounts 363 and 367, respectively, for attachment of the legs 312 and 314, respectively. As explained, the ring 370 can be disposed between the rotatable leg supports 362 and 366 where, for example, the ring 370 can include axles 372 and 374. As shown, the coupling 380 may include bores 382 and 384 that can receive the axles 372 and 374 to define a pivot axis of the coupling 380. As explained, the display assembly 200 may magnetically attach to the stand 300 via the coupling 380. For example, the coupling 380 can be seated on the surface 280 where, for example, the surface 280 may be a recessed surface, as defined by the raised portion 260, where a magnetic attraction force exists between material of the display assembly 200 and material of the coupling 380.

Figure 4:
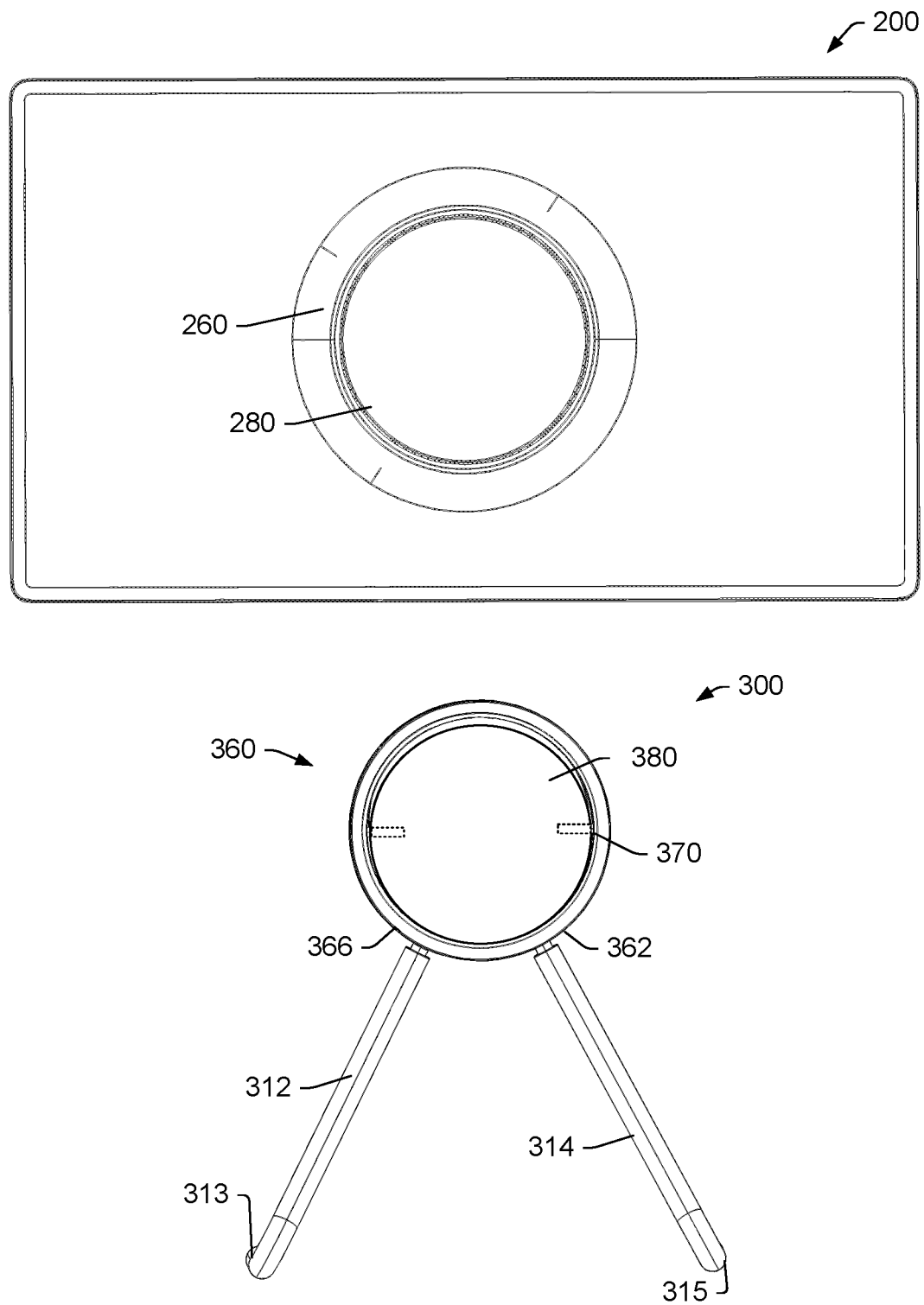
FIG. 4 is a series of back views of an example of a system.

FIG. 4 shows back side views of an example of the display assembly 200 and of an example of the stand 300. As shown, the coupling 380 of the stand 300 is shaped and sized to be received by the surface 280 of the display assembly 200. For example, the coupling 380 and the surface 280 may be circular in shape where the surface 280 includes a dimension that exceeds an outer dimension of the coupling 380. While magnetic coupling is mentioned, one or more other technologies may be utilized. For example, consider an interference fit where the coupling 380 may be firmly press-fit into the recess. As an example, a bayonet and/or threads may be utilized to couple the display assembly 200 to the coupling 380. As to use of magnetic coupling, it may provide a relatively "wearless" approach to attaching the display assembly 200 to the stand 300 where flat surfaces may come into contact without minimal risk of wear. A magnetic approach to coupling may be stable with respect to temperature. For example, where materials are utilized with different thermal coefficients of expansion, changes in temperature may not impact operation of the stand 300 for adjustably supporting the display assembly 200. As to an interference fit, where shapes, sizes, materials, etc., differ, it may be subject to some temperature dependency that may, for example, result in a tighter or looser fit.

Figure 5:
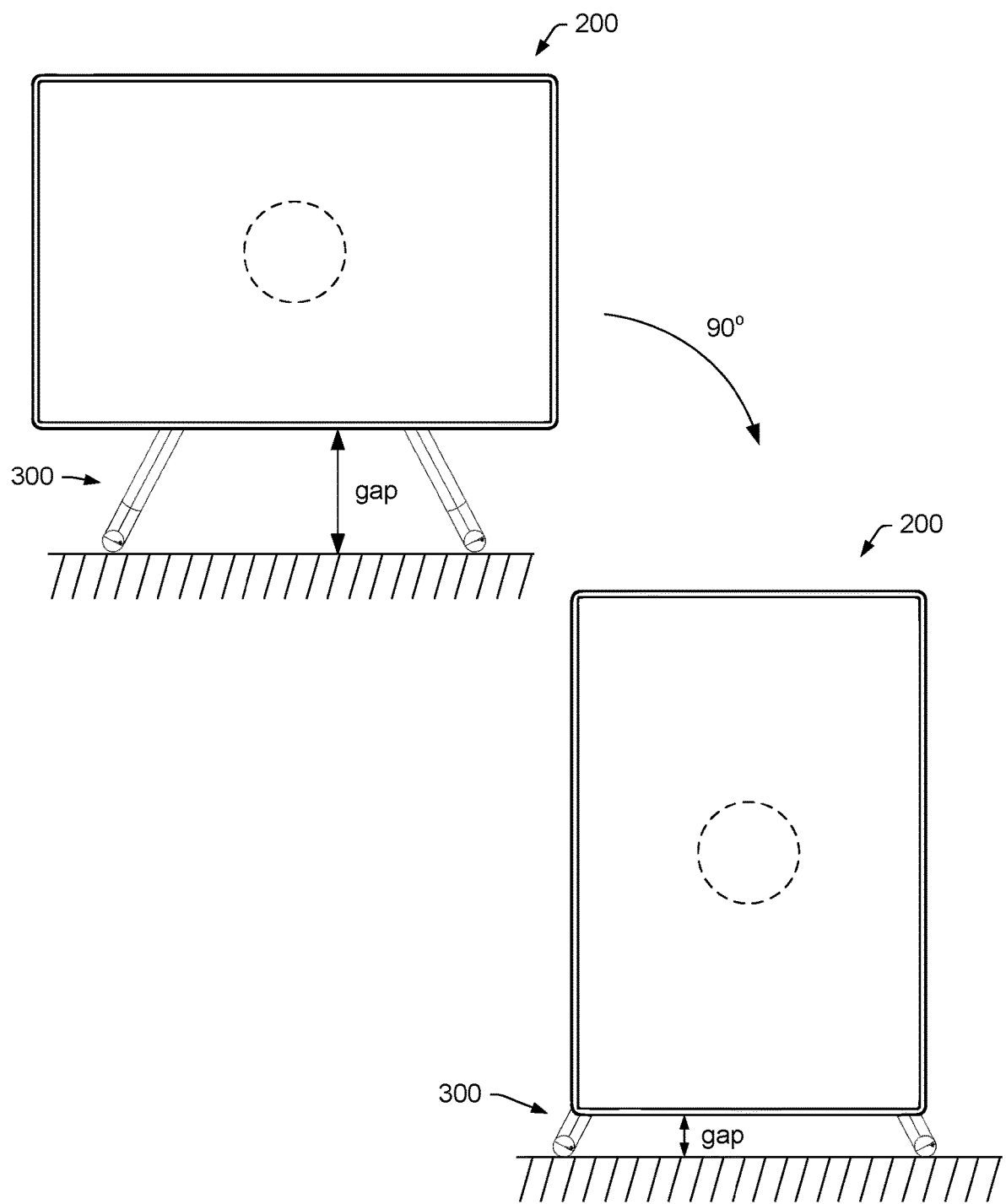
FIG. 5 is a series of front views of an example of a system.

FIG. 5 shows an example of the display assembly 200 as supported by an example of the stand 300 in a landscape position and in a portrait position where the spacing between the legs 312 and 314 of the stand 300 is the same. As shown, the display assembly 200 can be rotated by 90 degrees clockwise or counter-clockwise to transition from a landscape position to a portrait position and vice versa, optionally without adjusting a height of the stand 300. In the example of FIG. 5, a distance labeled as a gap is shown where the gap is sufficient to transition the display assembly 200 from a landscape position to a portrait position and vice versa.

Figure 6:
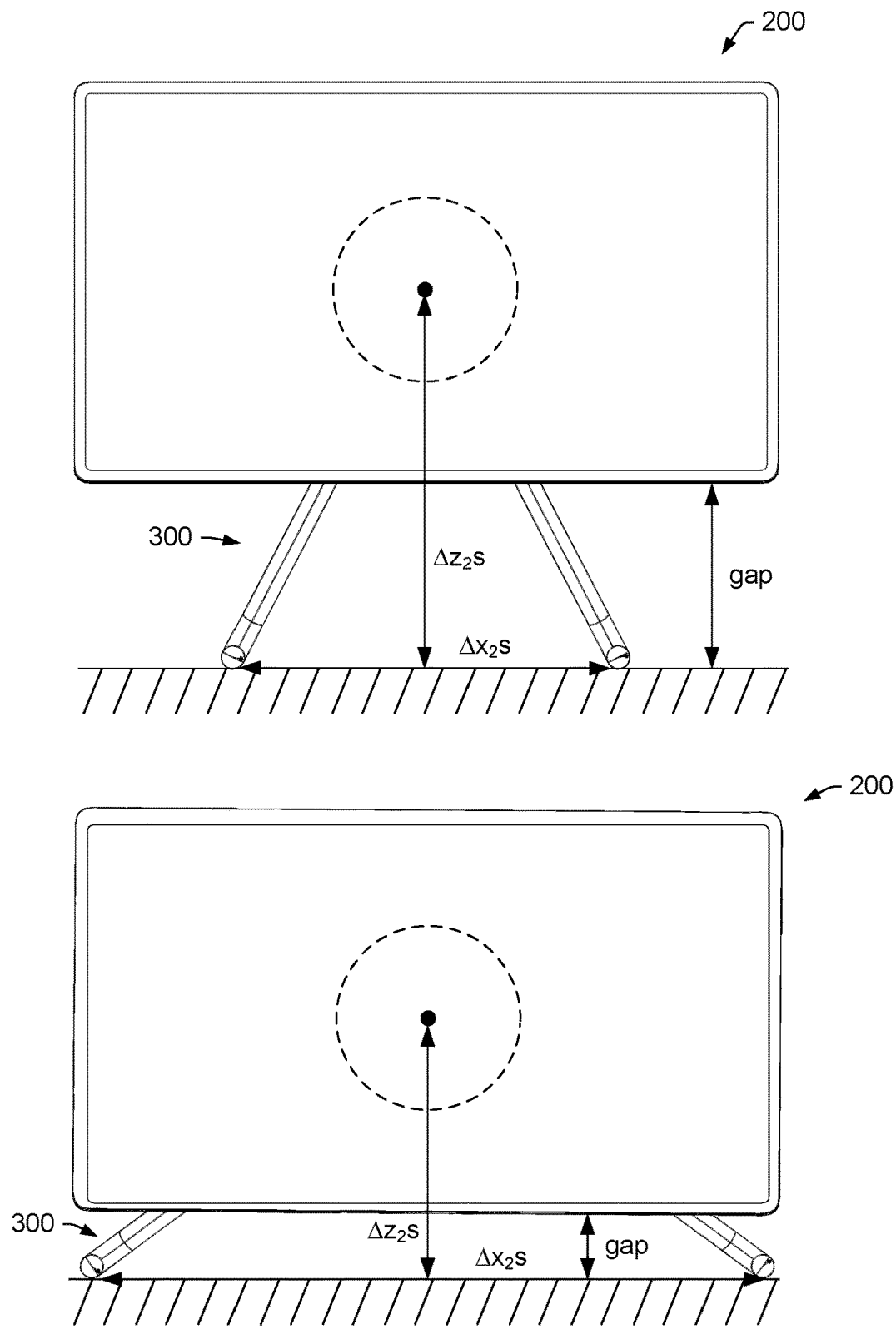
FIG. 6 is a series of front views of an example of a system.

FIG. 6 shows an example of the display assembly 200 as supported by an example of the stand 300 where the height of the stand 300 is shown to be adjustable, for example, in a manner that can change the gap (e.g., clearance between the display assembly 200 and a support surface and/or the legs 312 and 314 of the stand 300). As explained with respect to FIG. 1, a user may desire a wider spacing of the legs 312 and 314 such that the keyboard assembly 160 can be accommodated (e.g., to conserve desktop space, provide a cleaner desktop, etc.).

Figure 7:
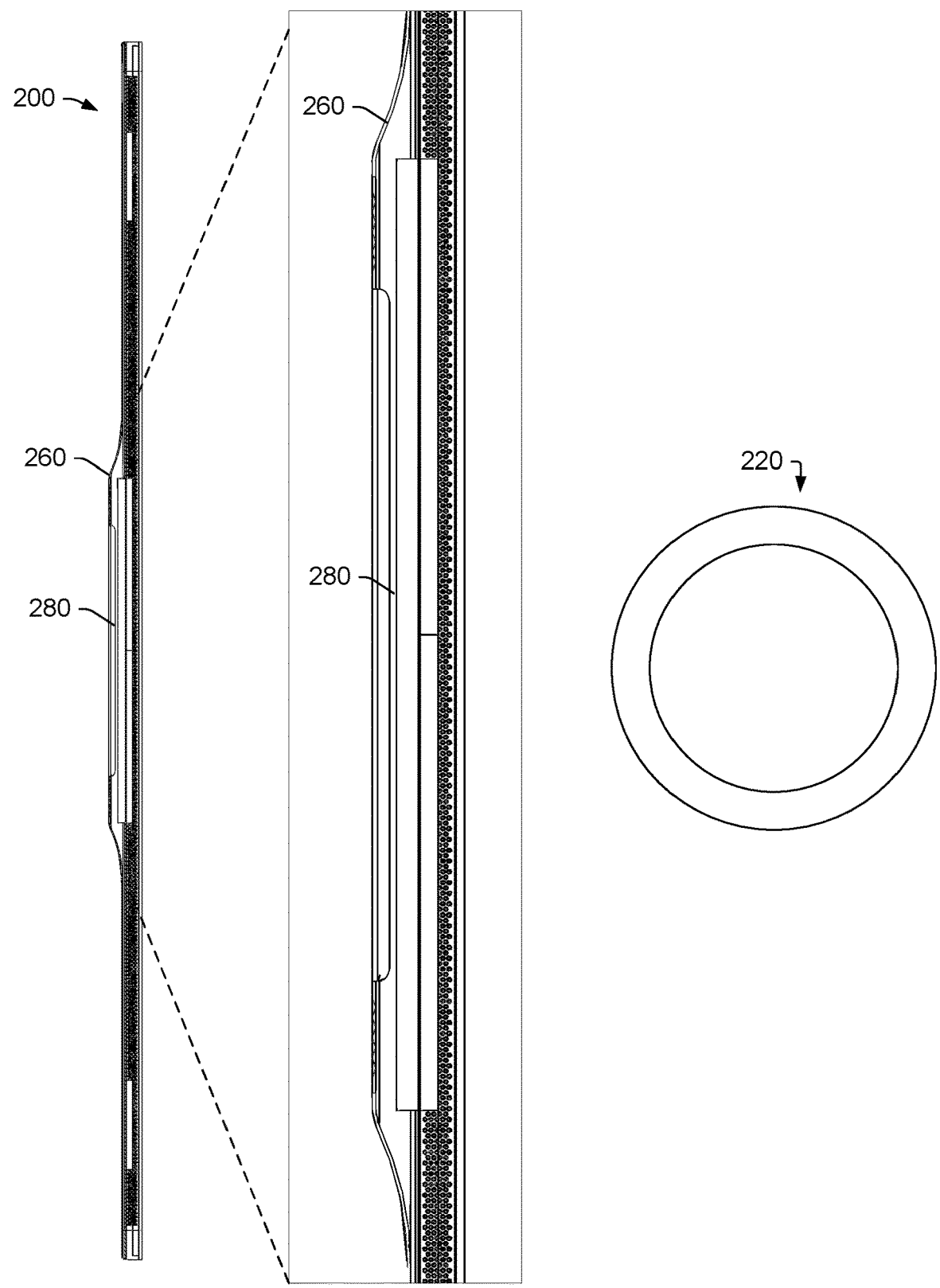
FIG. 7 is a cross-sectional view of an example of a display assembly.

FIG. 7 shows approximate cross-sectional views of an example of the display assembly 200 where the raised portion 260 provides space for one or more components, which can include circuitry 220 and/or one or more magnetic materials that form at least a portion of the surface 280 and/or are positioned proximate to the surface 280 (e.g., adjacent to the surface 280, etc.). As shown, the raised portion 260 can define an interior annular chamber that can accommodate circuitry and/or magnetic material and/or provide for airflow to cool circuitry during operation thereof. As an example, the display assembly 200 may include one or more grilles (e.g., openings), which may provide for cooling and/or emanation of sound (e.g., airflow). For example, one or more edges of the display assembly 200 may include openings for airflow.

As an example, the circuitry 220 can include one or more types of components, which may be part of a printed circuit board (PCB) that has a shape and size suitable for being at least in part accommodated by a chamber defined by a raised portion of a back side of a display assembly.

In the example of FIG. 7, the display assembly 200 can be made relatively thin where various circuitries can be consolidated within a region of the raised portion 260. As mentioned, the surface 280 may be adjacent to and/or formed by one or more materials that may be magnetic, which can include, for example, magnetized material (e.g., permanent magnet(s)) and/or ferromagnetic material that can be attracted to a magnet. As an example, a display assembly may include one or more shielding materials to shield circuitry from one or more magnetic fields. As an example, a coupling region of a display assembly may be configured to keep shape, size and/or magnitude of magnetic fields a suitable distance from circuitry that may be susceptible to a magnetic field (e.g., a static magnetic field and a moving static magnetic field).

As an example, a back side of a display assembly may be formed by molding, stamping, etc., material. As an example, a circular shaped raised portion may provide for desirable stress handling properties while also providing a chamber for positioning of one or more components, which can include circuitry. As explained, a raised portion may have a cylindrical type of shape to form a circular or annular chamber. As an example, a display assembly may be thinner at its edges and thicker at a raised portion where a stand can be attached to the display assembly.

Figure 8:
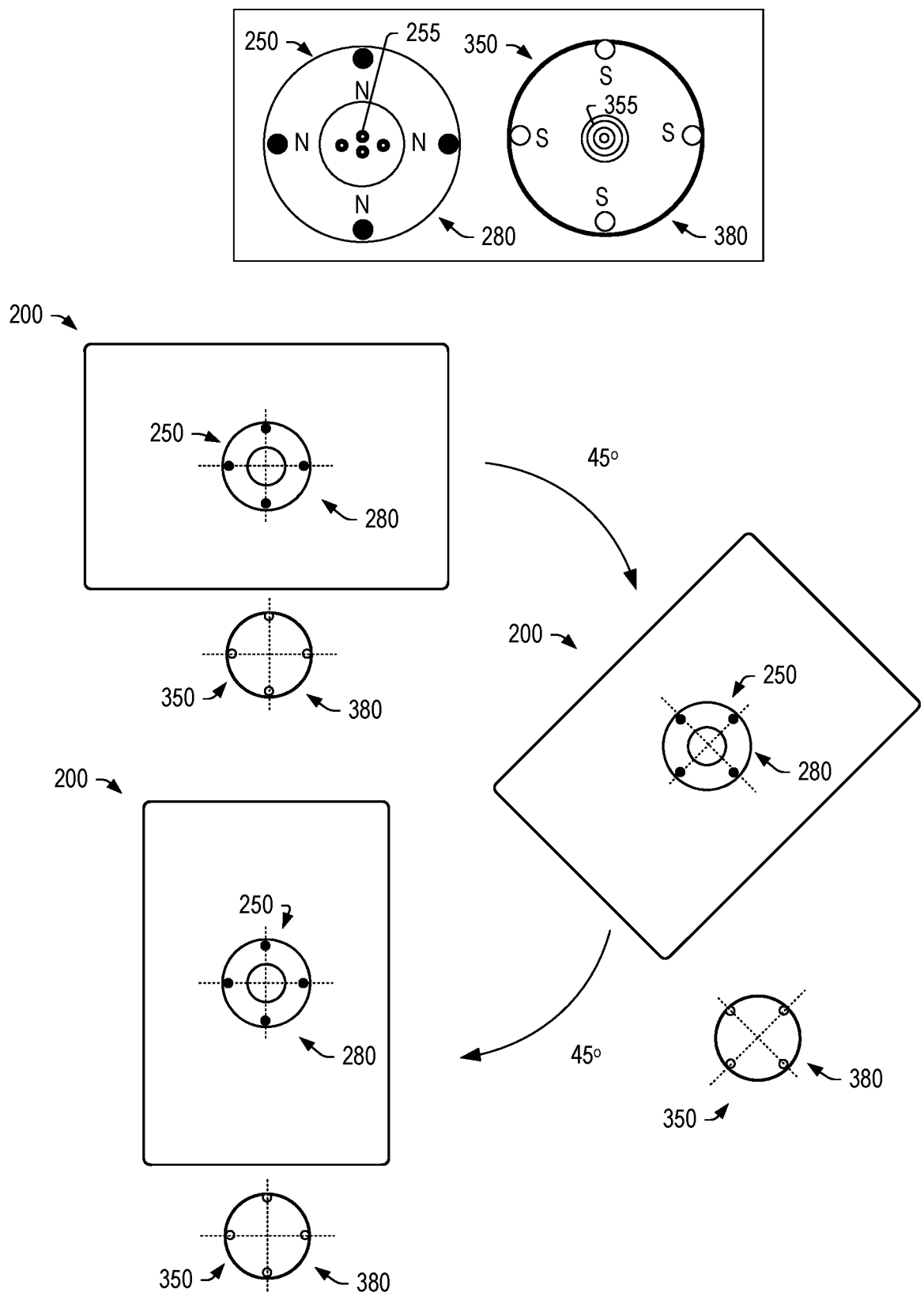
FIG. 8 is a series of views of examples of arrangements of magnets with respect to a display assembly and a stand.

FIG. 8 shows examples of arrangements of magnets 250 and 350 as associated with the surface 280 of the display assembly 200 and as associated with the coupling 380. In FIG. 8, examples of connectors 255 and 355 are also shown, which may be brought into contact (e.g., connected) via magnetic attraction force.

In FIG. 8, the display assembly 200 is shown as being rotated in unison with the coupling 380 where opposite poles of the arrangements of magnets 250 and 350 can be aligned to provide magnetic attraction force. As explained, the joint assembly 360 can include the ring 370 that can support the coupling 380. Where a user applies force to the display assembly 200, such as a torque about a display axis that is aligned with the axis zd of the coupling 380, the coupling 380 can rotate via the ring 370 where the arrangements of magnets 250 and 350 can remain with opposite poles aligned. As shown in the example of FIG. 8, the arrangements of magnets 250 and 350 can rotate in unison where the arrangement of magnets 250 may be in a fixed position with respect to the surface 280 and where the arrangement of magnets 350 may be in a fixed position on the coupling 380 where the coupling 380 is rotatable via the joint assembly 360 of the stand 300. As an example, a display device (e.g., a display assembly) may couple to a coupling of a stand in a portrait position or a landscape position. For example, arrangements of magnets may include symmetry that provides for coupling of a display device to a stand in portrait and landscape positions where, for example, features of a joint assembly may provide for rotation of the display device, once coupled to the stand, from a portrait position to a landscape position and vice versa.

Figure 9:
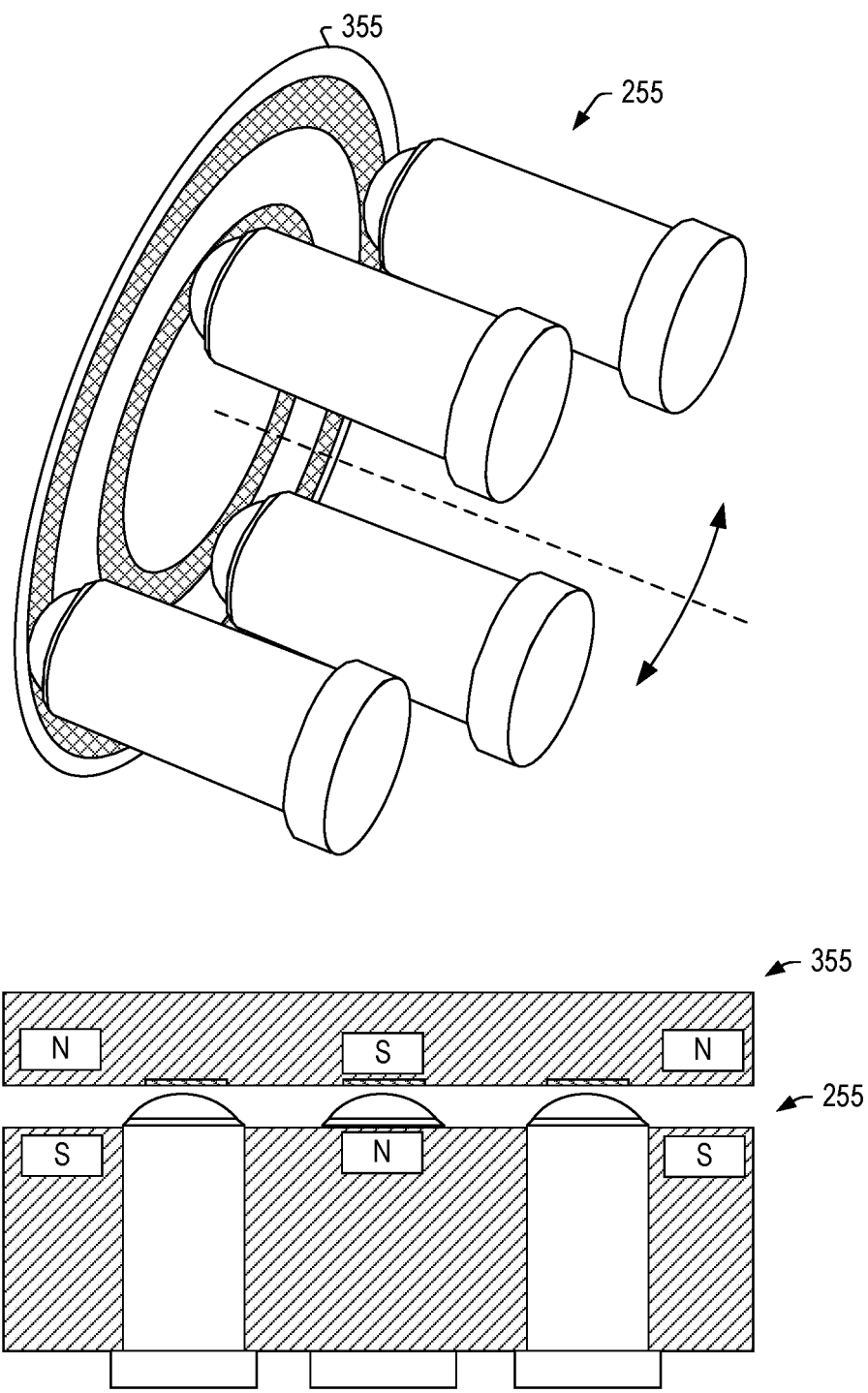
FIG. 9 is a perspective view and a cross-sectional view of examples of electrical contacts.

FIG. 9 shows a perspective view and a cross-sectional view of an example of the electrical contacts 255 and 355, noting that features for fewer or more electrical contacts may be provided. As shown, the electrical contacts 255 can include a number of spring-loaded balls disposed in cylindrical cases where they may be positioned in a holder that is rotatable, which may be rotatable upon rotation of a display assembly such as the display assembly 200. In such an example, with respect to the display assembly, the holder may be fixed. As shown, the electrical contacts 355 can include a number of races, which may include concentric races; noting that a race may be less than 360 degrees and/or may include segments (e.g., arc segments, etc.).

In the cross-sectional view of FIG. 9, magnets are shown, which may be included, for example, to maintain intimate contact between the electrical contacts 255 and 355. For example, one or both of the electrical contacts 255 and 355 may be movable in an axial direction such that a deviation in an axial distance does not break an electrical connection between the stand 300 and the display assembly 200. For example, a user transitioning the display assembly 200 from one position to another by rotation of the display assembly 200 may not wish to experience glitches due to loss of an electrical connection. As an example, the magnets shown in the cross-sectional view of FIG. 9 may be for purposes of maintaining electrical connection and optionally for support of the display assembly 200 with respect to the stand 300.

As an example, the arrangements of magnets 250 and 350 may provide sufficient magnetic attraction force such that a gap does not result in disconnection. As an example, spring-loaded electrical contacts may have sufficient amount of movement in an axial direction to handle a gap or gaps that may occur during a transition of the display assembly 200 from one orientation to another orientation. As explained, one or more mechanisms may be utilized to assure electrical connection is maintained, where desired, during a transition (e.g., a 90 degree transition).

Figure 10:
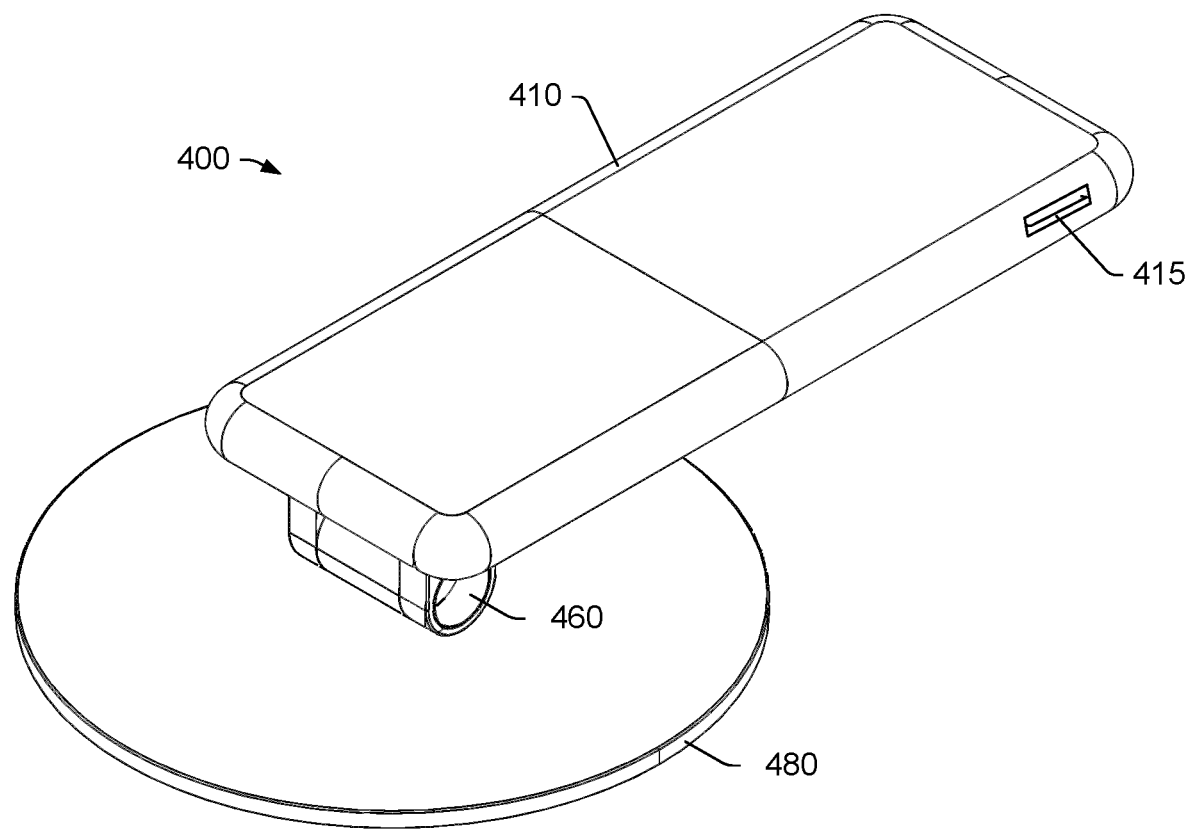
FIG. 10 is a perspective view of an example of a stand.

FIG. 10 shows an example of a stand 400 that includes a base 410, a joint assembly 460 and a coupling 480. As shown, the coupling 480 may be circular in shape. As an example, the coupling 480 may include various features of the coupling 380 of the stand 300. As shown in FIG. 10, the base 410 can include one or more connectors 415. For example, consider a data and/or power connector, which may be, for example, a USB type of connector (e.g., USB type C, etc.). As an example, a stand, a coupling, etc., may include a connector such as a data and/or power connector. For example, the stand 300 may include a connector such as the connector 415, which may be included with the coupling 380 or another part of the stand 300. As an example, a connector such as the connector 415 may be electrically coupled to another connector which may be an electrical contact connector (see, e.g., the electrical contacts 255 and 355 of FIG. 9). As an example, a stand may include dock or docking features such that a stand can provide for power and/or data communications for a device such as a display device (e.g., a display assembly, etc.).

Figure 11:
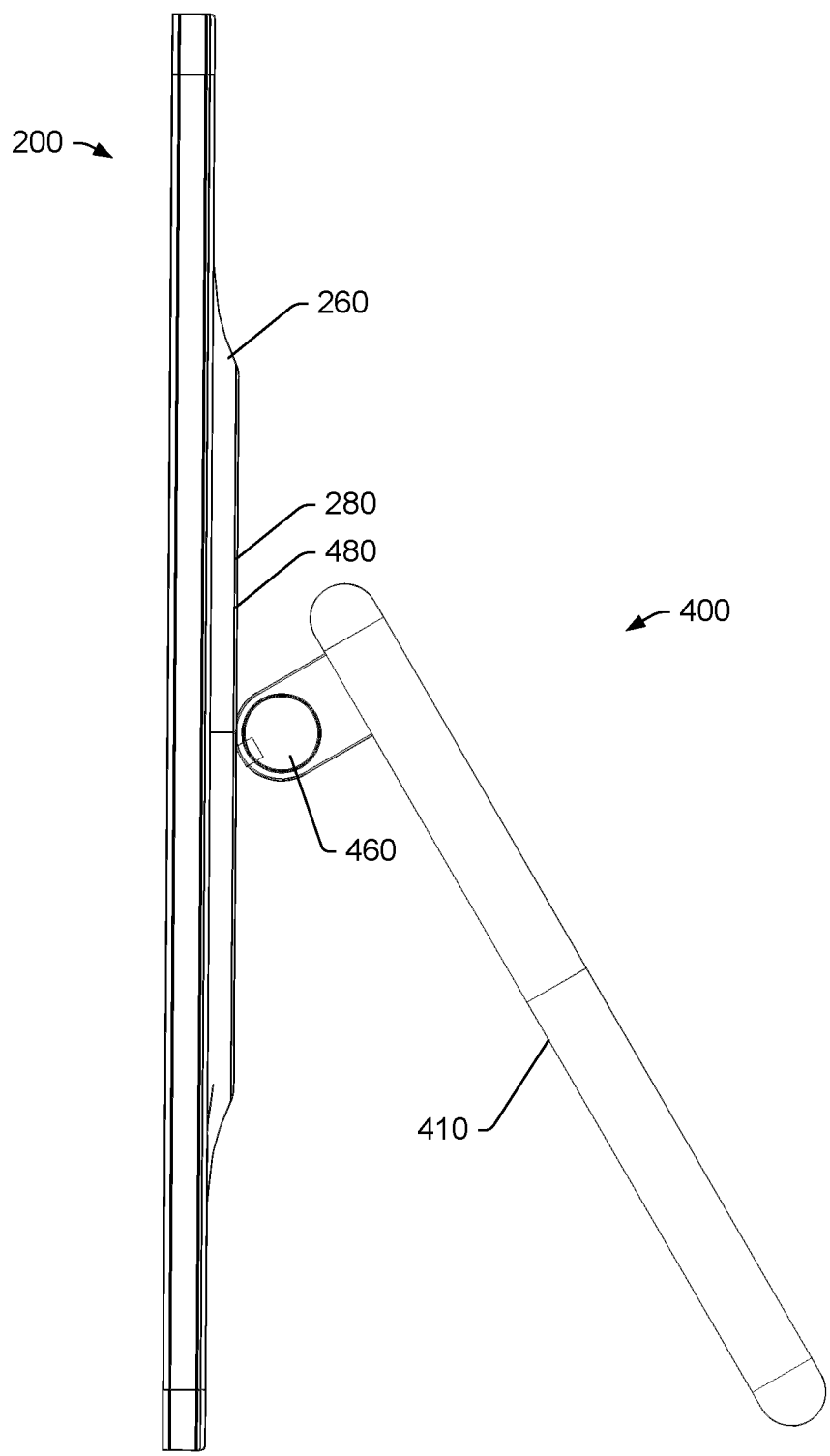
FIG. 11 is a perspective view of an example of a system.

FIG. 11 shows an example of the stand 400 attached to an example of the display assembly 200 where the display assembly 200 can be supported by an edge of the display assembly 200 and by an edge of the base 410 of the stand 400. As an example, an interior angle may be adjustable between the display assembly 200 and the base 410 via the joint assembly 460. As an example, the coupling 480 may include an arrangement of magnets that is symmetric to accommodate attachment to the display assembly 200 in a portrait position and in a landscape position. As an example, the coupling 480 may be rotatable via the joint assembly 460 such that the display assembly 200 can be rotated without detachment from the coupling 480.

As an example, the stand 400 may include circuitry that may couple with circuitry of the display assembly 200 via wire and/or via wireless circuitry. As an example, the stand 400 can include a speaker, a battery, a processor, memory, etc., which may be utilized in combination with the display assembly 200. For example, the stand 400 can include a battery that can power circuitry of the display assembly 200, which, as mentioned, may be an AIO device.

As an example, the base 410 of the stand 400 may be utilized as a handle to carry the display assembly 200. In such an example, the coupling 480 can attach to the display assembly 200 such that an attachment force is greater than a gravity force of the display assembly 200 (e.g., F=mg, where m is the mass of the display assembly 200).

Figure 12:
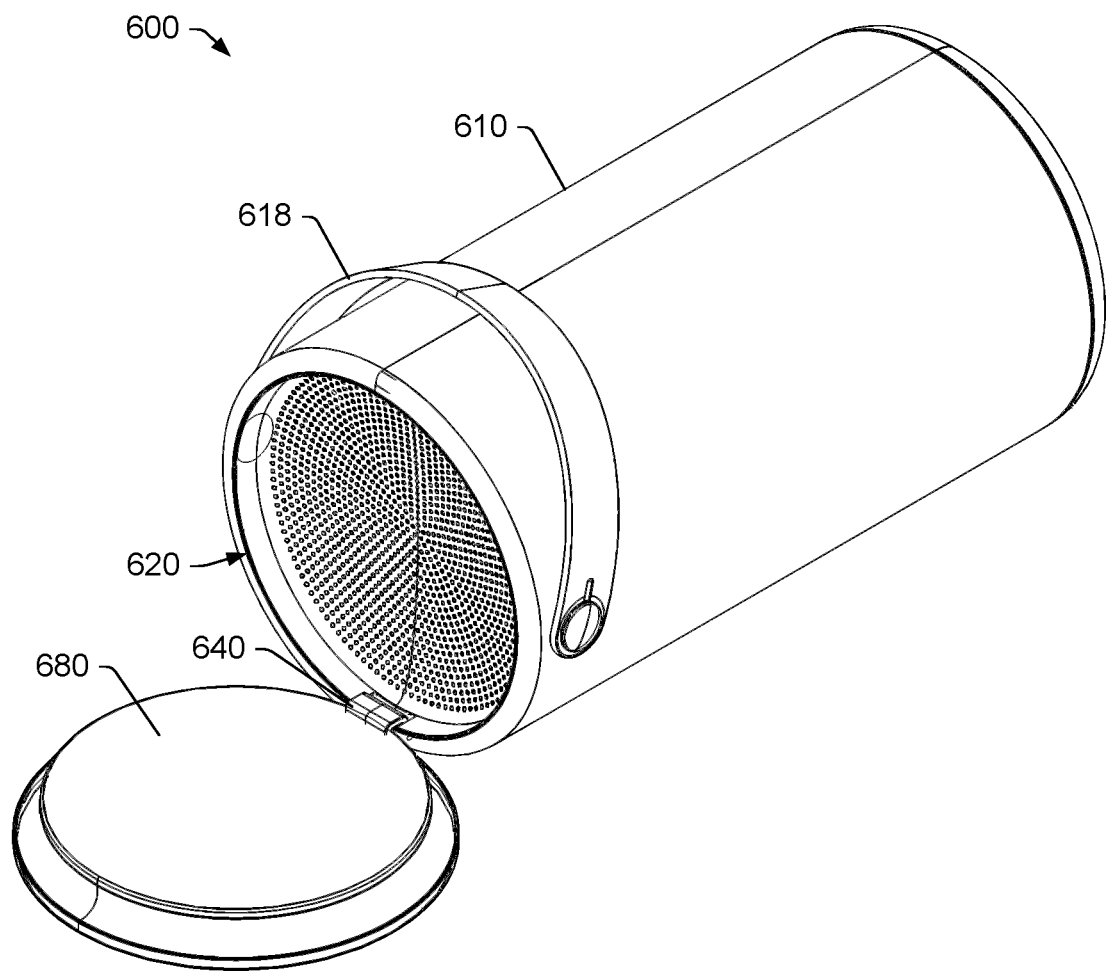
FIG. 12 is a perspective view of an example of a stand.

FIG. 12 shows an example of a stand 600 that includes a base 610, a handle 618, openings 620, a hinge 640 and a coupling 680. As an example, the stand 600 can include circuitry. For example, consider a fan, an air filter, a speaker, memory, a battery, etc. As an example, the openings 620 may be utilized for airflow, which may be for a fan and/or air filter (e.g., air purifier, etc.) and/or for one or more speakers. As an example, the stand 600 may include one or more connectors. For example, consider a data and/or power connector. As an example, the base 610 may include a connector such as, for example, the connector 415 of the example of FIG. 10.

As shown in the example of FIG. 12, the coupling 680 may be circular in shape. As an example, the coupling 680 may include various features of the coupling 380 of the stand 300.

Figure 13:
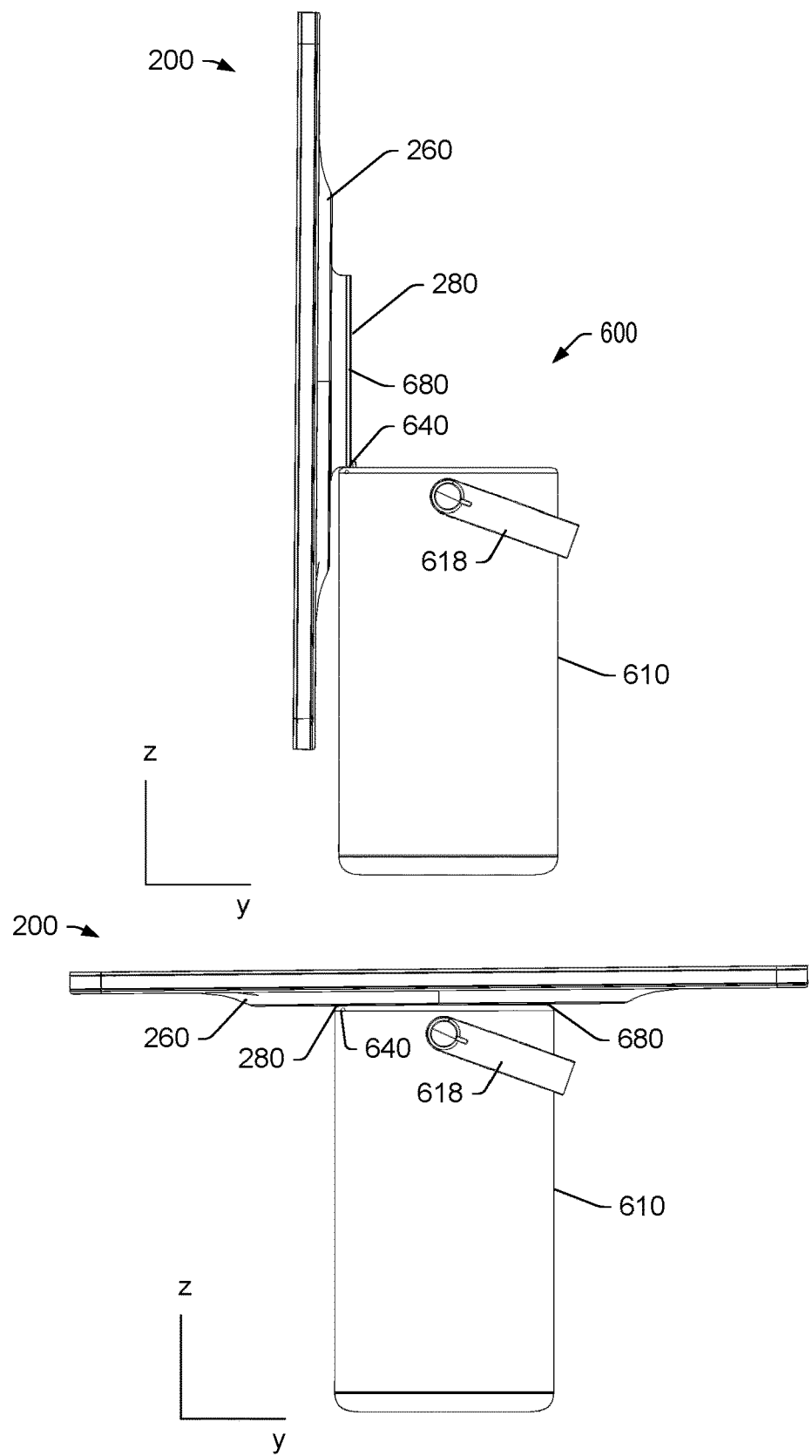
FIG. 13 is a series of side views of an example of a system.

FIG. 13 shows example side views of the stand 600 and the display assembly 200 where the coupling 680 can be a flap that can be in a closed position or in an open position. As shown, when the coupling 680 is open to approximately 90 degrees, the display assembly 200 may be substantially vertical; whereas, when the coupling 680 is closed to approximately 0 degrees, the display assembly 200 may be substantially horizontal.

As shown, the coupling 680 can cooperate with the surface 280 of the display assembly 200 where, for example, the surface 280 may be a recessed surface. As an example, a recessed surface may assist with positioning and may help to prevent extraneous material from being attracted to one or more magnets. Where a recessed surface and a coupling are joined, a joint may be formed where extraneous material cannot easily enter the joint, whether due to a small clearance and/or due to shielding or shape of magnetic field lines.

Figure 14:
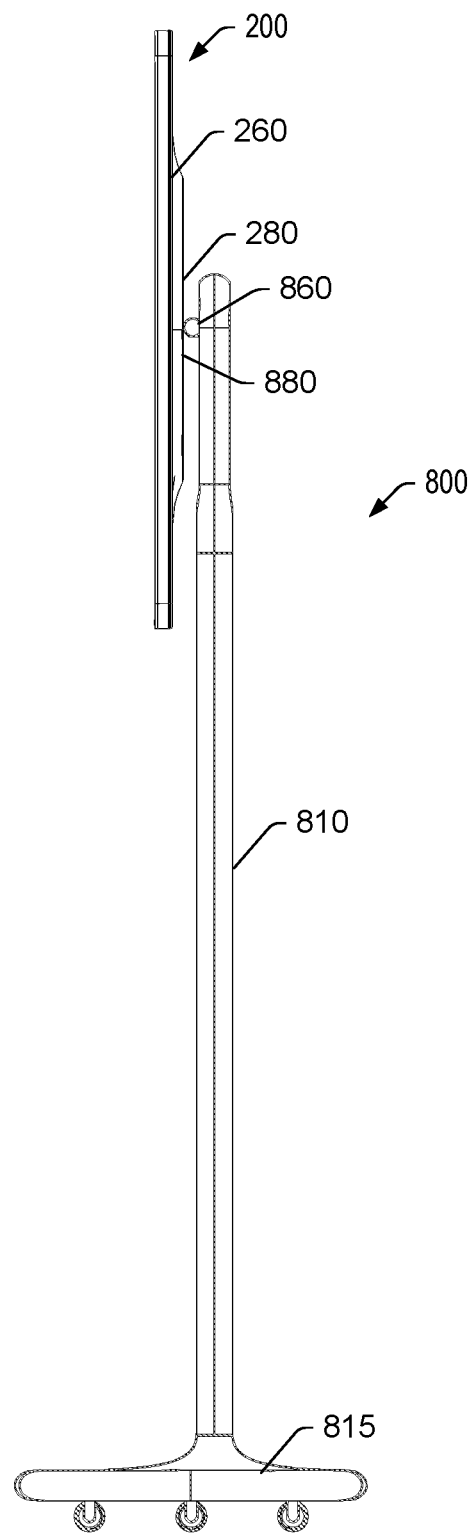
FIG. 14 is a perspective view of an example of a system.

FIG. 14 shows an example of a stand 800 that can attach to and support the display assembly 200. As shown in the example of FIG. 14, the stand 800 can include a base 810 with a wheel assembly 815 such that the stand 800 can be rolled along a support surface (e.g., a floor). As an example, the base 810 may be telescoping or otherwise adjustable in height.

In the example of FIG. 14, the stand 800 is shown as including a joint assembly 860 and a coupling 880 that can attach to the surface 280 of the display assembly 200, which, as mentioned, may be a recessed surface that is recessed with respect to the raised portion 260 of the display assembly 200.

Figure 15:
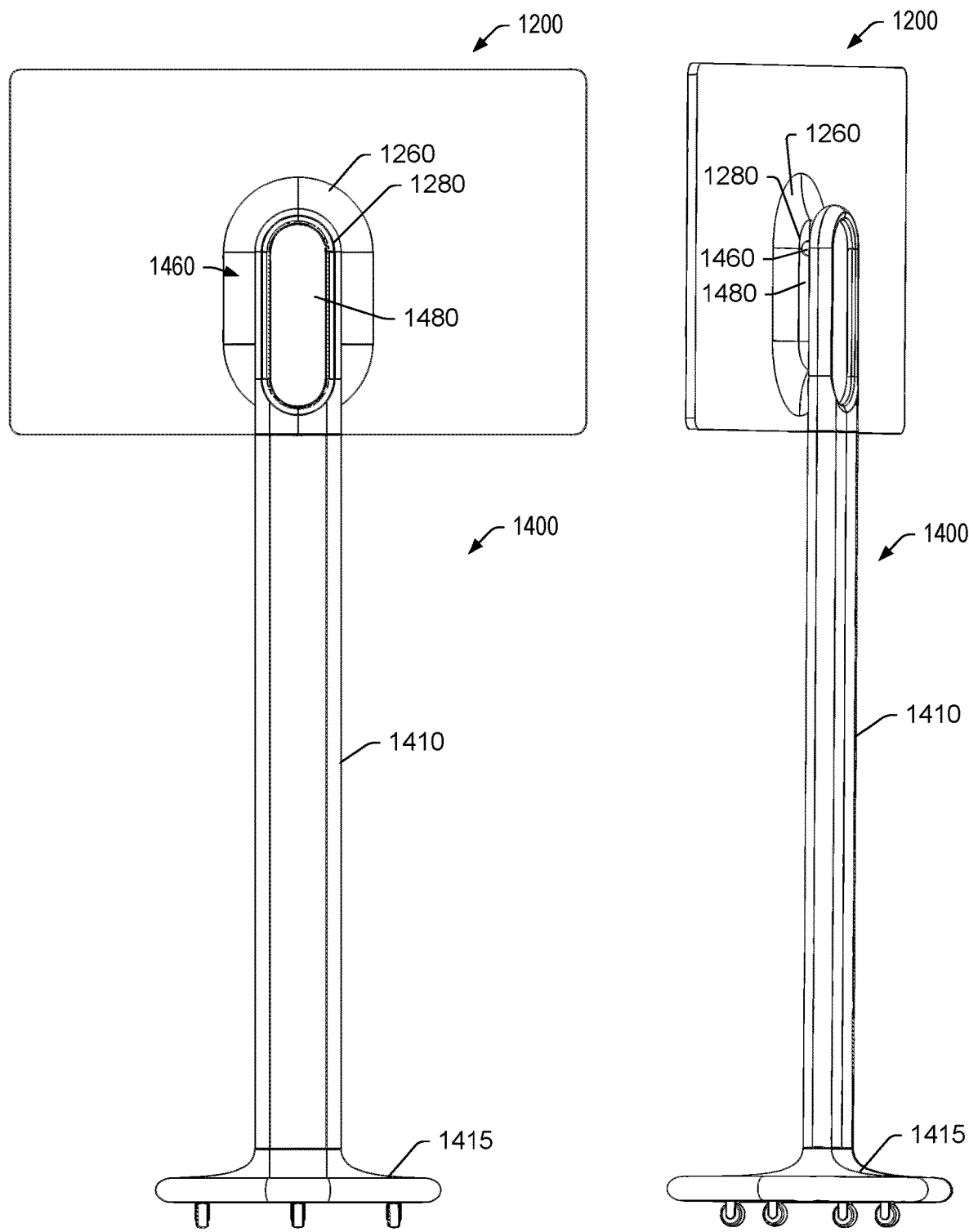
FIG. 15 is a series of views of an example of a system.

FIG. 15 shows an example of a display assembly 1200 and an example of a stand 1400 that can form a system. As shown, the stand 1400 can include various features of the example stand 800 of FIG. 14; however, in the example of FIG. 15, a coupling 1480 is shown as having a perimeter shaped as a stadium, which can include semi-circular ends spaced by a rectangle. As explained, a coupling may be circular or of another shape.

In the example of FIG. 15, the stand 1400 includes a base 1410, a wheel assembly 1415, a joint assembly 1460 and the coupling 1480 and the display assembly 1200 includes a raised portion 1260 and a surface 1280, which may be recessed surface. As shown, the surface 1280 may be shaped and sized similar to the coupling 1480. For example, the surface 1280 and the coupling 1480 may be stadium shaped or, for example, oval, elliptical, etc. As an example, the joint assembly 1460 may include one or more axles and bores (e.g., bushings) that can define a pivot axis. As an example, the display assembly 1200 may be tiltable with respect to the stand 1400. For example, the joint assembly 1460 may include a gimbal structure. As the stand 1400 can elevate the display assembly 1200 a considerable distance above a support surface (e.g., a floor), the display assembly 1200 may be set in a particular position such as a portrait position or a landscape position where the coupling 1480 does not provide for rotation when the display assembly 1200 is attached to the stand 1400.

As an example, the stand 400 of FIG. 10 and FIG. 11 may be shaped and sized to be attached to a stand such as the stand 1400. For example, the base 410 of the stand 400 may be stadium shaped and received in a socket of the stand 1400. In such an example, the stand 400 and a display assembly may be carried to the stand 1400 and then appropriately positioned, for example, to be wheeled around to a desired location. In such an example, the stand 1400 can accommodate a display assembly with a suitably shaped surface or with another stand that can be attached to the stand 1400.

As an example, the stand 1400 may include circuitry. For example, the stand 1400 may include one or more batteries that can supply power to a display assembly via one or more features (e.g., wired, wireless, etc.).

As explained, a display assembly, which may be an AIO device, can include a surface that allows for attachment of the display assembly to one or more types of stands. As an example, a display assembly may be provided with one or more stands where a user can select one or more of the stands for supporting the display assembly and/or for one or more other types of functionality (e.g., battery, speaker, fan, filter, processor, memory, etc.). As explained, various stands can promote mobility of a display assembly. For example, the stand 300 can be positioned in a relatively closed where an angle between the legs 312 and 314 may be small. In such an example, the stand 300 may be carried separately or as attached to a display assembly. As to the stand 400, it can be a relatively small stand that may be suitable for various use scenarios, including transport where the stand 400 is relatively easy to carry, may be used as a handle and may provide back-up power support (e.g., via one or more batteries).

As explained, a stand can include circuitry that may be utilized via wire and/or wirelessly. For example, a stand can include wireless charging circuitry that can transfer power to a display assembly (e.g., to a battery of a display assembly).

As explained, a stand may include one or more magnets that can provide for magnetic coupling to a display assembly and/or a display assembly may include one or more magnets that can provide for magnetic coupling to a stand. As an example, a stand can include circuitry and a magnetic attachment mechanism that allows a user to be able to change stand functionalities and connect a stand and a display assembly via one or more types of connectors such as, for example, via one or more spring-biased or spring-loaded connectors (e.g., pogo-pins, etc.), which may provide for delivery of power and/or data.

As an example, a circular form factor of a display assembly may provide for attachment to various types of stands. For example, a stand and display assembly may magnetically connect via a circular recess of the display assembly to help ensure reliable connectivity and to offer landscape and portrait modes.

As explained, a stand may be a kickstand where such a kickstand may optionally cooperate with another stand. As mentioned, the stand 400 of FIG. 10 and FIG. 11 may be received by a socket of a larger stand. As explained, a display assembly can include a surface for swappable stands. For example, a swappable kickstand can allow a user to enjoy room-to-room portability and create a pop-up workstation that enables easy transitions between productivity, consumption and entertainment. As explained with respect to the example of FIG. 1, a keyboard assembly may be paired with a display assembly where the keyboard assembly may be wired and/or wireless.

As explained with respect to the example stands 800 and 1400 of FIG. 14 and FIG. 15, a stand can include wheels to provide room to room mobility, kiosk positioning, information positioning (e.g., in airports, meeting halls, etc.) and/or entertainment experiences.

As explained, a stand may include one or more speakers, optionally along with one or more other types of circuitry. For example, a stand may include computing components that can enhance computational power of a display assembly that may be a lightweight AIO device. In such an example, a display assembly may include a processor and memory where a stand includes a more powerful processor and additional memory. In such an example, the display assembly may be fan-less while the stand may include a fan or other air mover for purposes of cooling circuitry and/or one or more other purposes (e.g., air movement, air filtration, air purification, etc.).

As an example, a stand may include features for improved graphics and rendering to a display of a display assembly. For example, a stand may be a gaming stand that can enhance execution of gaming applications for a display assembly.

As an example, a stand may be a type of docking station where a user can connect a laptop computing device to a display assembly via the stand. For example, a stand may include one or more ports where a laptop computing device can connect with the stand in a cabled and/or cable-less manner where circuitry of the laptop computing device can interact with circuitry of the display assembly, for example, to control rendering of content to a display of the display assembly. Where a laptop computing device is connected to a display assembly, a user may have an option of using multiple displays (e.g., a display of the display assembly and a display of the laptop computing device). While a laptop computing device is mentioned, a tablet form factor computing device (e.g., a tablet computing device) may be connected to a display assembly via a stand or, for example, the tablet computing device may be utilized with a stand or stands.

As an example, a stand may include a battery, a charger, one or more processors, memory (e.g., optionally removable), a speaker or speakers, a microphone or microphones, voice enabled assistant circuitry, smart hub circuitry, a turntable, one or more network interfaces and/or one or more other features. As an example, a stand may include ballast that may help to weigh down the stand.

As an example, a stand can include one or more speakers (e.g., woofer, tweeter, etc.), one or more microphones (e.g., a microphone array), one or more lights, one or more volume controls, a remote control unit, a step-down regulator optionally with an integrated switcher, a lower power multichannel audio codec, an audio signal amplifier, a digital media processor, random access memory (RAM), flash memory, a Wi-Fi module, a BLUETOOTH module, an integrated power management integrated circuit (IC), one or more programmable multi-output LED drivers, one or more low power multichannel audio signal analog to digital converters (ADC), one or more dual positive-edge-triggered D-type flip-flops, etc.

As an example, a stand can include one or more features of a device such as, for example, the AMAZON ECHO device, which includes a woofer with a reflex port, a tweeter, a 7-microphone array, a light ring volume adjustment, a remote control, a Texas Instruments TPS53312 step-down regulator with integrated switcher, a Texas Instruments TLV320DAC3203 ultra low power stereo audio codec, a Texas Instruments TPA3110D2 15 W filter-free class D stereo amplifier, a Texas Instruments DM3725CUS100 Digital Media Processor (DMP), Samsung K4X2G323PD-8GD8 256 MB LPDDR1 RAM, SanDisk SDIN7DP2-4G 4 GB iNAND ultra flash memory, a Qualcomm ATHEROS QCA6234X-AM2D Wi-Fi and BLUETOOTH Module, a Texas Instruments TPS65910A1 integrated power management IC, four Texas Instruments LP55231 programmable 9-output LED drivers, four Texas Instruments TLV320ADC3101 92 dB SNR low power stereo ADCs, Texas Instruments SN74LVC74A dual positive-edge-triggered D-type flip-flops, and seven S1053 0090 V6 microphones.

As an example, a stand can include circuitry that can offer weather from a weather service and news from a variety of sources, including local radio stations, BBC, NPR, and ESPN from a service provider. As an example, a stand can include circuitry that plays music from an account holder's one or more accounts with digital music providers and a device may include built-in support for streaming music services like IHEARTRADIO, PANDORA, SIRIUS XM, SPOTIFY and APPLE music, among one or more others. As an example, a stand can include circuitry that provides support for IFTTT and NEST thermostats and/or one or more other environmental controllers for a site (e.g., HVAC controllers, etc.). As an example, a stand can include circuitry that can play music from a music streaming service such as GOOGLE PLAY MUSIC, for example, from a smartphone and/or a tablet via a short-range communication link (e.g., BLUETOOTH, etc.) and/or via one or more other types of connections.

As an example, a system can include a display assembly that includes a rectangular housing that includes a back side that includes a raised portion and an attachment surface adjacent to the raised portion; and a stand that includes a base, a joint assembly and a coupling that magnetically couples to the attachment surface of the display assembly. In such an example, the display assembly can be pivotable via the joint assembly of the stand. For example, consider the display assembly as being rotatable via the joint assembly of the stand.

As an example, a joint assembly of a stand can include a gimbal, where a coupling is pivotable via the gimbal. In such an example, the gimbal can include a rotatable ring.

As an example, a base of a stand can include legs. For example, consider a base that includes leg supports, where legs are adjustable via the leg supports to adjust an angle between the legs. In such an example, the can include leg supports that are circular and independently rotatable. For example, a leg support may include a post, a socket, etc., for attachment of a leg where rotation of the leg support can provide for adjusting an angle between one leg and another leg.

As an example, a joint assembly can include a series of circular structures. In such an example, the series of circular structures can include a gimbal ring, a first leg support and a second leg support. In such an example, the gimbal ring may be disposed at least in part between a first leg support and a second leg support. As an example, where a joint assembly includes circular structures, each of the circular structures may be independently rotatable about a common axis.

As an example, a display assembly can include a first arrangement of magnets and a coupling can include a second arrangement of magnets. In such an example, the first arrangement of magnets and the second arrangement of magnets can include pairs of magnets with opposite polarity. As an example, a display assembly can magnetically couple to a coupling of a stand in a first position and in a second position where, in the second position, the display assembly can be rotated by 90 degrees with respect to the first position. For example, consider a portrait position as a first position and a landscape position as a second position. As explained, legs of a stand may be adjustable to provide for a gap where desired between a display assembly and a support surface and/or a portion of a stand.

As an example, an attachment surface can be circular and a coupling can be circular. In such an example, a coupling can fit onto an attachment surface, which, as explained, may be a recessed surface or otherwise configured with respect to a raised surface of a display assembly.

As an example, an attachment surface may be stadium shaped and/or a coupling may be stadium shaped.

As an example, a display assembly can include circuitry and a stand can include circuitry that operatively couples to the circuitry of the display assembly. As explained, a stand may include one or more connectors that can be for data and/or power. As explained, a stand may include a battery or batteries that can be charged via a connector, which may be a wired and/or a wireless connector. For example, consider a stand that includes a battery that can be charged wirelessly where power of the battery can be provided to a display assembly, which may be provided via wire and/or wirelessly.

As an example, a raised portion of a back side of a rectangular housing of a display assembly can define a chamber. In such an example, the display assembly can include circuitry disposed at least in part in the chamber. In such an example, a display assembly may be made relatively thin at its edges where a raised portion provides a thickness suitable for circuitry and for defining a portion of the display assembly that can be coupled to a stand. In such an example, the raised portion may provide for increased integrity that can handle coupling and decoupling forces from attachment and detachment from a stand. As explained, a raised portion can be suitably shaped to guide a coupling of a stand to an appropriate portion of a display assembly such that the stand can appropriately attach to the display assembly.

As explained, a raised portion of a display assembly may be circular in shape, may include a stadium shape, etc. In various examples, the shape of a raised portion may provide for adequate handling of stresses. For example, a circle can be a suitable shape for handling stresses when compared to a square. In mechanics, a cylinder stress is a stress distribution with rotational symmetry; that is, which remains unchanged if the stressed object is rotated about some fixed axis. Cylinder stress patterns can include: circumferential stress, or hoop stress, a normal stress in the tangential (azimuth) direction; axial stress, a normal stress parallel to the axis of cylindrical symmetry; and radial stress, a normal stress in directions coplanar with but perpendicular to the symmetry axis. As explained, various components, assemblies, etc., can include circular features that may provide for suitable handling of stresses, which may be defined using one or more cylinder stress patterns. As explained, a circular structure may be symmetric with respect to stress such that, for example, rotational orientation of a display assembly with respect to a stand does not substantially alter stress handling ability where the display assembly and the stand are coupled.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 16:
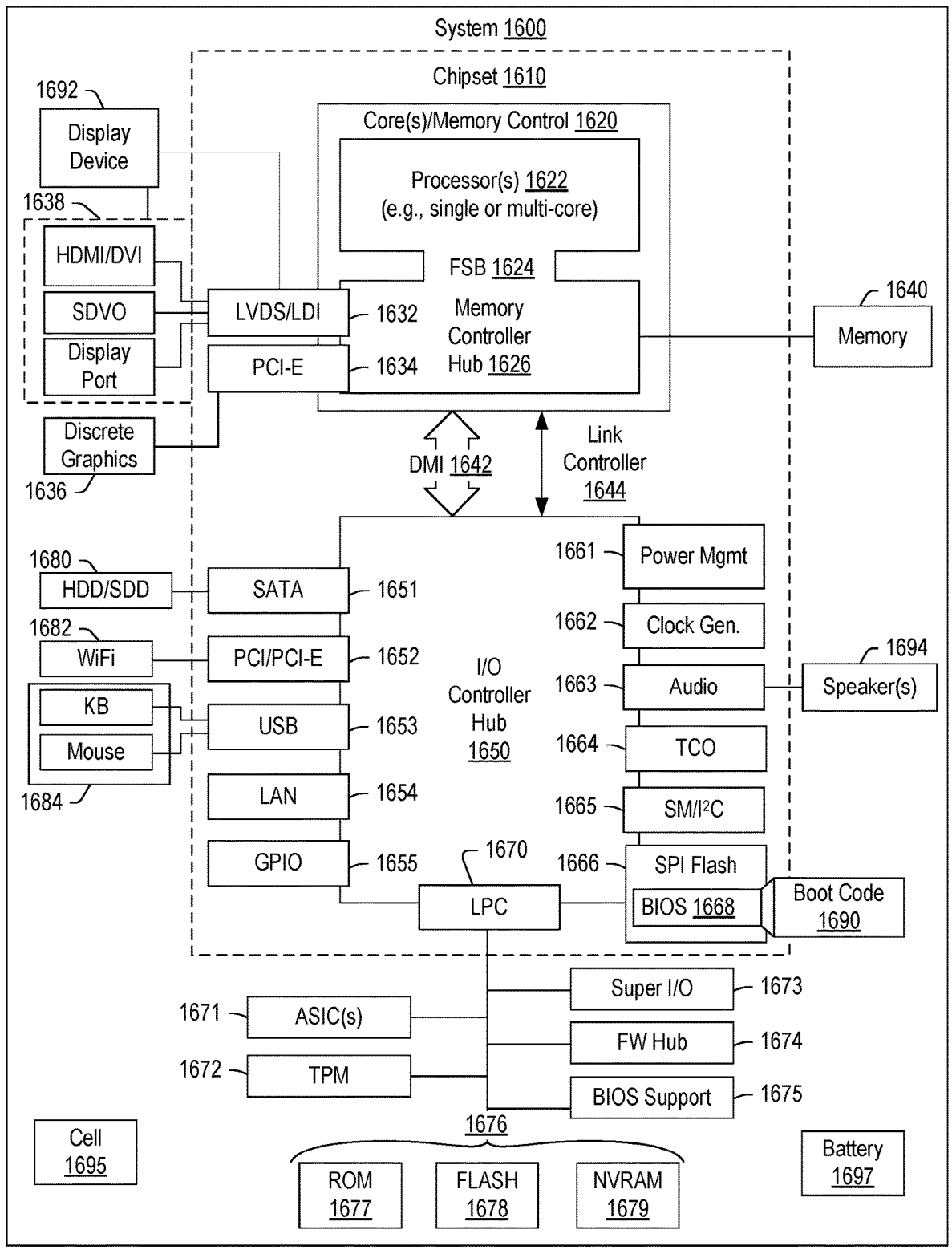
FIG. 16 is a diagram of an example of a system.

While various examples of circuits or circuitry have been discussed, FIG. 16 depicts a block diagram of an illustrative computer system 1600. The system 1600 may be a computer system sold by Lenovo (US) Inc. of Morrisville, NC (e.g., a THINKSTATION® system, etc.); however, as apparent from the description herein, a satellite, a base, a display, a dock, a keyboard, a computing device, a server or other machine may include one or more features and/or other features of the system 1600.

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, NC). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 16, the system 1600 includes a so-called chipset 1610. A chipset refers to a group of integrated circuits, or chips, that are designed to work together. Chipsets are usually marketed as a single product (e.g., consider chipsets marketed under the brands INTEL®, AMD®, etc.).

In the example of FIG. 16, the chipset 1610 has a particular architecture, which may vary to some extent depending on brand or manufacturer. The architecture of the chipset 1610 includes a core and memory control group 1620 and an I/O controller hub 1650 that exchange information (e.g., data, signals, commands, etc.) via, for example, a direct management interface or direct media interface (DMI) 1642 or a link controller 1644. In the example of FIG. 16, the DMI 1642 is a chip-to-chip interface (sometimes referred to as being a link between a "northbridge" and a "southbridge").

The core and memory control group 1620 include one or more processors 1622 (e.g., single core or multi-core) and a memory controller hub 1626 that exchange information via a front side bus (FSB) 1624. As described herein, various components of the core and memory control group 1620 may be integrated onto a single processor die, for example, to make a chip that supplants the conventional "northbridge" style architecture.

The memory controller hub 1626 interfaces with memory 1640. For example, the memory controller hub 1626 may provide support for DDR SDRAM memory (e.g., DDR, DDR2, DDR3, etc.). In general, the memory 1640 is a type of random-access memory (RAM). It is often referred to as "system memory".

The memory controller hub 1626 further includes a low-voltage differential signaling interface (LVDS) 1632. The LVDS 1632 may be a so-called LVDS Display Interface (LDI) for support of a display device 1692 (e.g., a CRT, a flat panel, a projector, etc.). A block 1638 includes some examples of technologies that may be supported via the LVDS interface 1632 (e.g., serial digital video, HDMI/DVI, display port). The memory controller hub 1626 also includes one or more PCI-express interfaces (PCI-E) 1634, for example, for support of discrete graphics 1636. Discrete graphics using a PCI-E interface has become an alternative approach to an accelerated graphics port (AGP). For example, the memory controller hub 1626 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1650 includes a variety of interfaces. The example of FIG. 16 includes a SATA interface 1651, one or more PCI-E interfaces 1652 (optionally one or more legacy PCI interfaces), one or more USB interfaces 1653, a LAN interface 1654 (more generally a network interface), a general purpose I/O interface (GPIO) 1655, a low-pin count (LPC) interface 1670, a power management interface 1661, a clock generator interface 1662, an audio interface 1663 (e.g., for speakers 1694), a total cost of operation (TCO) interface 1664, a system management bus interface (e.g., a multi-master serial computer bus interface) 1665, and a serial peripheral flash memory/controller interface (SPI Flash) 1666, which, in the example of FIG. 16, includes BIOS 1668 and boot code 1690. With respect to network connections, the I/O hub controller 1650 may include integrated gigabit Ethernet controller lines multiplexed with a PCI-E interface port. Other network features may operate independent of a PCI-E interface.

The interfaces of the I/O hub controller 1650 provide for communication with various devices, networks, etc. For example, the SATA interface 1651 provides for reading, writing or reading and writing information on one or more drives 1680 such as HDDs, SDDs or a combination thereof. The I/O hub controller 1650 may also include an advanced host controller interface (AHCI) to support one or more drives 1680. The PCI-E interface 1652 allows for wireless connections 1682 to devices, networks, etc. The USB interface 1653 provides for input devices 1684 such as keyboards (KB), one or more optical sensors, mice and various other devices (e.g., microphones, cameras, phones, storage, media players, etc.). On or more other types of sensors may optionally rely on the USB interface 1653 or another interface (e.g., I²C, etc.). As to microphones, the system 1600 of FIG. 16 may include hardware (e.g., audio card) appropriately configured for receipt of sound (e.g., user voice, ambient sound, etc.).

In the example of FIG. 16, the LPC interface 1670 provides for use of one or more ASICs 1671, a trusted platform module (TPM) 1672, a super I/O 1673, a firmware hub 1674, BIOS support 1675 as well as various types of memory 1676 such as ROM 1677, Flash 1678, and non-volatile RAM (NVRAM) 1679. With respect to the TPM 1672, this module may be in the form of a chip that can be used to authenticate software and hardware devices. For example, a TPM may be capable of performing platform authentication and may be used to verify that a system seeking access is the expected system.

The system 1600, upon power on, may be configured to execute boot code 1690 for the BIOS 1668, as stored within the SPI Flash 1666, and thereafter processes data under the control of one or more operating systems and application software (e.g., stored in system memory 1640). An operating system may be stored in any of a variety of locations and accessed, for example, according to instructions of the BIOS 1668. Again, as described herein, a satellite, a base, a server or other machine may include fewer or more features than shown in the system 1600 of FIG. 16. Further, the system 1600 of FIG. 16 is shown as optionally include cell phone circuitry 1695, which may include GSM, CDMA, etc., types of circuitry configured for coordinated operation with one or more of the other features of the system 1600. As shown, the system 1600 may include one or more batteries 1697 and, for example, battery management circuitry.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
   a display assembly that comprises a rectangular housing that comprises a back side that comprises; and
   a stand that comprises a base, a joint assembly and a coupling that magnetically couples to the attachment surface of the display assembly, wherein the base comprises legs, wherein the joint assembly comprises rotatable leg supports to adjust an angle between the legs and, correspondingly, a height of the stand, wherein the joint assembly comprises a gimbal, wherein the coupling is pivotable via the gimbal, wherein the gimbal comprises a rotatable ring, and wherein the rotatable leg supports and the rotatable ring are independently rotatable about a common axis of rotation.

2. The system of claim 1, wherein the leg supports are circular.

3. The system of claim 1, wherein the joint assembly comprises a series of circular structures.

4. The system of claim 3, wherein the series of circular structures comprises the rotatable ring of the gimbal and each of the leg supports, wherein the leg supports comprise a first leg support and a second leg support.

5. The system of claim 4, wherein the rotatable ring of the gimbal is disposed at least in part between the first leg support and the second leg support.

6. The system of claim 1, wherein the display assembly comprises a first arrangement of magnets and wherein the coupling comprises a second arrangement of magnets.

7. The system of claim 6, wherein the first arrangement of magnets and the second arrangement of magnets comprise pairs of magnets with opposite polarity.

8. The system of claim 6, wherein the display assembly magnetically couples to the coupling of the stand in a first position and in a second position wherein, in the second position, the display assembly is rotated by 90 degrees with respect to the first position.

9. The system of claim 1, wherein the attachment surface is circular and wherein the coupling is circular.

10. The system of claim 1, wherein the attachment surface is stadium shaped and wherein the coupling is stadium shaped.

11. The system of claim 1, wherein the display assembly comprises circuitry and wherein the stand comprises circuitry that operatively couples to the circuitry of the display assembly.

12. The system of claim 1, wherein the back side of the rectangular housing comprises a raised portion, wherein the raised portion of the back side of the rectangular housing defines a chamber.

13. The system of claim 12, wherein the display assembly comprises circuitry disposed at least in part in the chamber.

14. A system comprising:
    a display assembly that comprises a rectangular housing that comprises a back side that comprises an attachment surface; and
    a stand that comprises a base, a joint assembly and a coupling that magnetically couples to the attachment surface of the display assembly, wherein the base comprises a first leg and a second leg, wherein the joint assembly comprises a series of circular structures, and wherein the series of circular structures comprises a gimbal ring, a first leg support and a second leg support, wherein each of the circular structures is rotatable about a common axis of rotation, wherein rotation of the gimbal ring rotates the coupling, and wherein rotation of the first leg support and the second leg support adjusts an angle between the first leg and the second leg.

15. The system of claim 14, wherein the gimbal ring is disposed at least in part between the first leg support and the second leg support.

16. The system of claim 14, wherein the first leg support comprises a first groove, wherein the second leg support comprises a second groove, wherein the gimbal ring is seated by the first groove and the second groove, wherein the gimbal ring comprises axles, or bores that receive axles, that define a pivot axis, and wherein the coupling is pivotable about the pivot axis.

\* \* \* \* \*